(12) United States Patent
Fuller et al.

(10) Patent No.: US 9,582,189 B2
(45) Date of Patent: Feb. 28, 2017

(54) DYNAMIC TUNING OF MEMORY IN MAPREDUCE SYSTEMS

(71) Applicant: International Business Machines Corporation, Armonk, NY (US)

(72) Inventors: Nicholas C. Fuller, North Hills, NY (US); Min Li, San Jose, CA (US); Shicong Meng, Elmsford, NY (US); Jian Tan, Wappingers Falls, NY (US); Liangzhao Zeng, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 14/262,056

(22) Filed: Apr. 25, 2014

(65) Prior Publication Data
US 2015/0309731 A1 Oct. 29, 2015

(51) Int. Cl.
*G06F 3/06* (2006.01)
*G06F 9/48* (2006.01)

(52) U.S. Cl.
CPC .......... *G06F 3/0604* (2013.01); *G06F 3/0631* (2013.01); *G06F 3/0673* (2013.01); *G06F 9/4881* (2013.01)

(58) Field of Classification Search
CPC .... G06F 3/0604; G06F 3/0673; G06F 9/4881; G06F 3/0631
See application file for complete search history.

(56) References Cited

U.S. PATENT DOCUMENTS

| 7,831,773 B2 | 11/2010 | Zedlewski et al. |
| 8,276,148 B2 | 9/2012 | Cho et al. |

(Continued)

FOREIGN PATENT DOCUMENTS

CN 102915255 A1 6/2013

OTHER PUBLICATIONS

Chen et al. Accelerating MapReduce on a coupled CPU-GPU Architecture, IEEE, 2012 SC—International Conference for High Performance Computing, Networking, Storage and Analysis, Nov. 10-16, 2012.

(Continued)

*Primary Examiner* — Michael Alsip
(74) *Attorney, Agent, or Firm* — Ryan, Mason & Lewis, LLP

(57) ABSTRACT

Methods, systems, and computer program products for dynamic tuning of memory in MapReduce systems are provided herein. A method includes analyzing (i) memory usage of a first sub-set of multiple tasks associated with a MapReduce job and (ii) an amount of data utilized across the first sub-set of the multiple tasks; determining a memory size to be allocated to the first sub-set of the multiple tasks based on said analyzing, wherein said memory size minimizes a cost function related to said memory usage and said amount of data utilized; performing a task-wise performance comparison among a second sub-set of the multiple tasks associated with the MapReduce job using the determined memory size to be allocated to the first sub-set of the multiple tasks to generate a set of memory allocation results; and dynamically applying the set of memory allocation results to one or more additional tasks associated with the MapReduce job.

20 Claims, 3 Drawing Sheets

(56) References Cited

U.S. PATENT DOCUMENTS

| | | |
|---|---|---|
| 2009/0313635 A1 | 12/2009 | Dasdan |
| 2011/0173410 A1 | 7/2011 | Castillo et al. |
| 2012/0158816 A1 | 6/2012 | Choi et al. |
| 2012/0198466 A1* | 8/2012 | Cherkasova .......... G06F 9/5066 718/104 |
| 2012/0311581 A1 | 12/2012 | Balmin et al. |
| 2013/0104140 A1 | 4/2013 | Meng et al. |
| 2013/0185729 A1 | 7/2013 | Vasic et al. |
| 2014/0215178 A1 | 7/2014 | Li et al. |

OTHER PUBLICATIONS

Papagiannis et al. Rearchitecting MapReduce for Heterogeneous Multicore Processors with Explicitly Managed Memories, IEEE Computer Society, 39th International Conference on Parallel Processing (ICPP 2010), Sep. 13-16, 2010, p. 121-30.

* cited by examiner

DYNAMIC TUNING OF MEMORY IN MAPREDUCE SYSTEMS

FIELD OF THE INVENTION

Embodiments of the invention generally relate to information technology, and, more particularly, to MapReduce technology.

BACKGROUND

A MapReduce framework commonly manipulates records, such as, for example, by sorting map task outputs and merging sorting records from multiple map tasks. Challenges arise, however, in guaranteeing in-memory operation, which can be important for performance optimization. For example, some existing MapReduce implementations attempt to control the amount of memory used for storing the output of map results. If this amount of memory is sufficiently large, all output of a map task can be sorted in memory at the end of the task execution without involving input/output (I/O) operations on a physical disk. Otherwise, however, the map task would incur multiple "spills" and external sorting occurs. As used herein, a spill refers to the process of writing in-memory content to persistent storage (such as disks) to free up memory for new content.

Additionally, many existing approaches within the context of MapReduce systems use either a static value or a percentage of total available memory. However, with such approaches, the optimal static value or percentage value heavily depends on the specific application and/or input data. For example, the amount of data generated by a map task depends on the corresponding application logic and input data.

Further, other existing approaches include offline modeling and/or offline tuning of memory parameters. Such approaches include using batched profiling to collect performance data over multiple operation iterations, with each iteration having a different configuration. By building models with the collected data, a guided configuration value can be determined. However, such an offline technique requires multiple operation iterations before a useful value can be determined, and results cannot be reused for different applications and/or different input data.

Accordingly, a need exists for dynamic online tuning of memory in MapReduce systems.

SUMMARY

In one aspect of the present invention, techniques for dynamic tuning of memory in MapReduce systems are provided. An exemplary computer-implemented method can include steps of analyzing (i) memory usage of a first sub-set of multiple tasks associated with a MapReduce job and (ii) an amount of data utilized across the first sub-set of the multiple tasks; determining a memory size to be allocated to the first sub-set of the multiple tasks based on said analyzing, wherein said memory size minimizes a cost function related to said memory usage and said amount of data utilized; performing a task-wise performance comparison among a second sub-set of the multiple tasks associated with the MapReduce job using the determined memory size to be allocated to the first sub-set of the multiple tasks to generate a set of memory allocation results; and dynamically applying the set of memory allocation results to one or more additional tasks associated with the MapReduce job.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
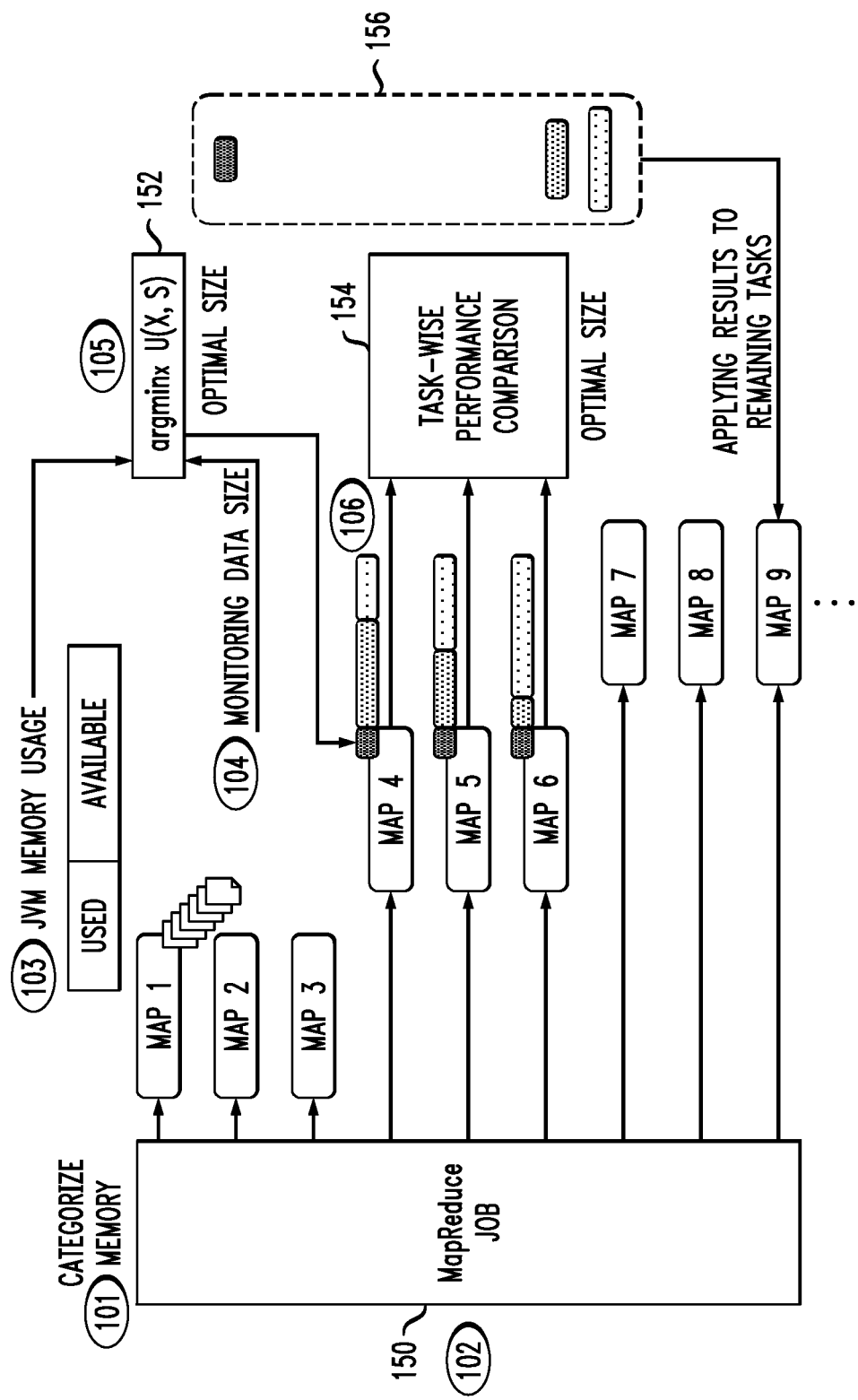
FIG. 1 is a diagram illustrating an example embodiment, according to an aspect of the invention.

As described herein, an aspect of the present invention includes techniques for dynamic tuning of memory in MapReduce systems. In at least one embodiment of the invention, monitoring information is used to determine the amount of data utilized in memory operations of different tasks (for example, all tasks running in a given system). Also, optimization techniques are used to determine an optimal or desired memory allocation based on the distribution of data size over the different tasks. Further, a population of concurrent tasks with different memory allocations can be used to determine an optimal size of memory allocation for each task when the amount of data associated with such a task is not directly measureable.

As detailed herein, at least one embodiment of the invention includes categorizing memory and/or buffers belonging to the same task and/or Java virtual machine (JVM). Also, a targeted MapReduce job can be started, which dispatches multiple map and/or reduce tasks running in parallel, each dealing with a subset of data. Additionally, at least one embodiment of the invention includes monitoring the memory usage within a given task and/or JVM. Such a monitoring step can be achieved through measuring JVM memory usage with an operating system (OS) level monitoring tool and a MapReduce management application programming interface (API). For memory and/or buffers with a targeted data size that is directly measurable, at least one embodiment of the invention includes monitoring the distribution of the data size over different tasks.

By way of illustration, consider the following example embodiment, wherein X represents the ideal memory and/or buffer size, S represents the actual amount of data, and U represents the cost function which takes (X, S) as input. The goal of at least one such example embodiment includes determining the optimal X that minimizes the expectation of U(X, S) given the distribution of S.

An example of the above-noted cost function can include $U(X_i, S_i)$, wherein $X_i$ represents the memory size for task i, and wherein $S_i$ represents the data size for task i. Additionally, considerations of such an example embodiment can include underutilization, wherein memory could potentially be used in other and/or additional places (for example, additional buffers are allocated with less memory), as well as a spill, wherein there is insufficient memory to avoid disk and/or network I/O. In both cases, insufficient memory allocation leads to additional disk I/O, which can be measured as the cost. Also, in at least one embodiment of the invention, parameters to be utilized in association with cost function U can be identified or determined by running a (small) number of tasks with different memory allocations. Such parameters refer to the allocated memory size for each task.

For the remaining memory that is not utilized, at least one embodiment of the invention includes setting different tasks with different size allocations and monitoring the corresponding performance of each task. Once sufficient performance results are collected, the remaining tasks can be allocated an optimal memory value for corresponding optimal performance. By way of example, to determine the optimal memory size for a map task, at least one embodiment of the invention can include running multiple map tasks simultaneously, each with a different memory size configuration. Such an embodiment can then include measuring the time required for each task to finish. Accordingly, the map task that first finishes first (that is, most quickly) in this example embodiment is the task with the optimal memory size.

FIG. 1 is a diagram illustrating an example embodiment, according to an aspect of the invention. By way of illustration, FIG. 1 depicts a MapReduce job 150, a cost function component 152, and a task-wise performance comparison component 154, as well as multiple steps in carrying out an example embodiment of the invention associated therewith. Also, as further detailed below, component 156 represents a set of results identifying the optimal memory sizes for different buffers within a task. As illustrated in FIG. 1, step 101 includes categorizing memory belonging to a given JVM. Additionally, step 102 includes commencing execution of MapReduce job 150, which dispatches multiple map tasks running in parallel, each dealing with a subset of data. As depicted in the FIG. 1 example, these multiple map tasks are represented as Map 1, Map 2, Map 3, Map 4, Map 5, Map 6, Map 7, Map 8 and Map 9.

Step 103 includes monitoring the memory usage of a first sub-set of the multiple map tasks (namely, Map 1, Map 2 and Map 3) (for example, monitoring memory usage with respect to used memory and available memory). As depicted in the FIG. 1 example, this initial monitoring step is applied to the first batch of map tasks (that is, Map 1, Map 2 and Map 3). However, it should be appreciated that such a monitoring step can be applied to all map tasks to continuously update the optimal memory size in case that the memory usage pattern of map tasks varies during the lifetime of a MapReduce job.

Further, step 104 includes monitoring data size across the first sub-set of the multiple map tasks, and step 105 includes determining, via the cost function component 152, the optimal X that minimizes a cost function of the first sub-set of the multiple map tasks, wherein X represents memory size, S represents the amount of data, and U represents the cost function which takes (X, S) as input.

Additionally, step 106 includes performing, via component 154, a task-wise performance comparison of a second sub-set of the multiple map tasks (namely, Map 4, Map 5 and Map 6) based on the optimal memory value determined in step 105 to generate the set of results 156. Additionally, the set of results 156 can be applied to the remaining map tasks (namely, Map 7, Map 8 and Map 9), whereby such application includes allocating the optimal memory value for corresponding performance.

Figure 2:
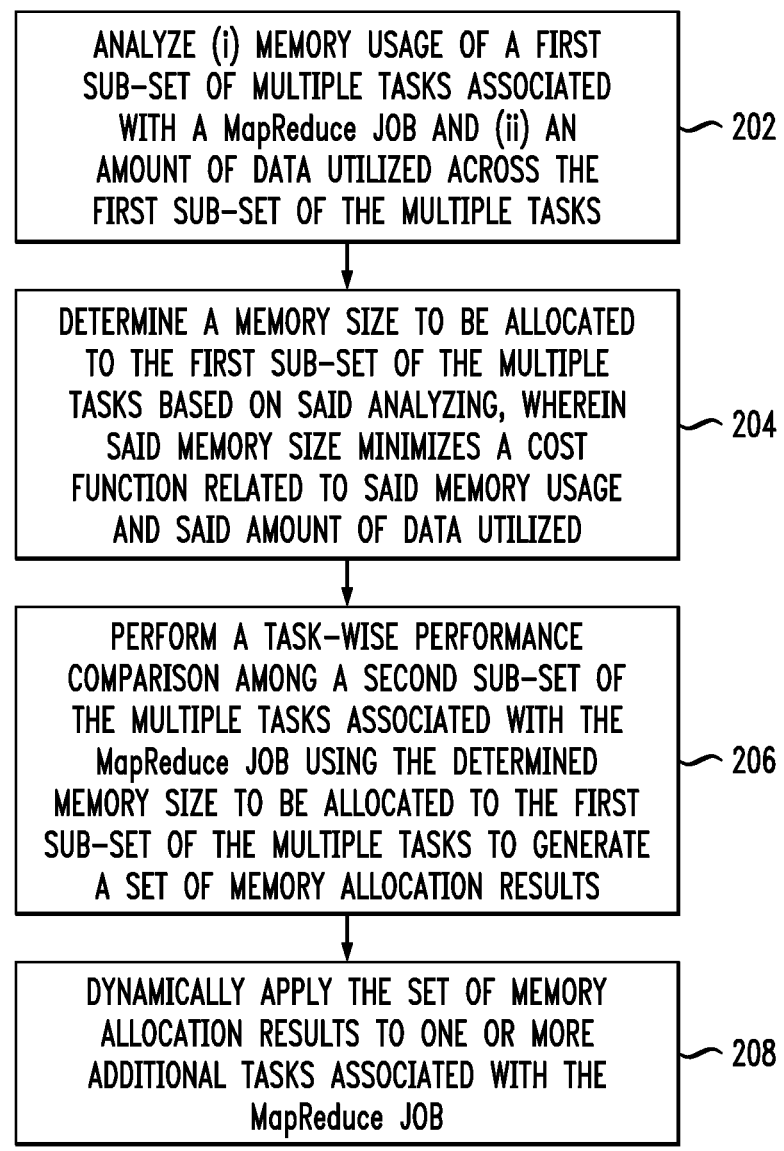
FIG. 2 is a flow diagram illustrating techniques according to an embodiment of the invention.

FIG. 2 is a flow diagram illustrating techniques according to an embodiment of the present invention. Step 202 includes analyzing (i) memory usage of a first sub-set of multiple tasks associated with a MapReduce job and (ii) an amount of data utilized across the first sub-set of the multiple tasks. The analyzing step can include analyzing used memory and available memory for each of the first sub-set of multiple tasks.

Also, the analyzing step can include categorizing multiple types of memory usage associated with the multiple tasks associated with the MapReduce job. Additionally, categorization can include differentiating the multiple types of memory usage by assigning multiple memory sizes to the multiple tasks associated with the MapReduce job based on (i) estimated memory usage of each of the multiple tasks, (ii) an impact on end-to-end performance of the MapReduce job attributed to each of the multiple tasks, and/or (iii) a distribution of data size across the multiple tasks.

Step 204 includes determining a memory size to be allocated to the first sub-set of the multiple tasks based on said analyzing, wherein said memory size minimizes a cost function related to said memory usage and said amount of data utilized.

Step 206 includes performing a task-wise performance comparison among a second sub-set of the multiple tasks associated with the MapReduce job using the determined memory size to be allocated to the first sub-set of the multiple tasks to generate a set of memory allocation results. In at least one embodiment of the invention, the set of memory allocation results incorporates an input/output cost and memory usage.

Step 208 includes dynamically applying the set of memory allocation results to one or more additional tasks associated with the MapReduce job. Dynamically applying the set of memory allocation results can include dynamically applying the memory allocation results to one or more additional tasks associated with the MapReduce job, wherein the amount of data associated with the one or more additional tasks is not measureable.

The techniques depicted in FIG. 2 can also include commencing execution of the MapReduce job, wherein said execution dispatches the multiple tasks associated with the MapReduce job. Also, in at least one embodiment of the invention, each of the multiple tasks can run in parallel, and each of the multiple tasks can operate with a given subset of data.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
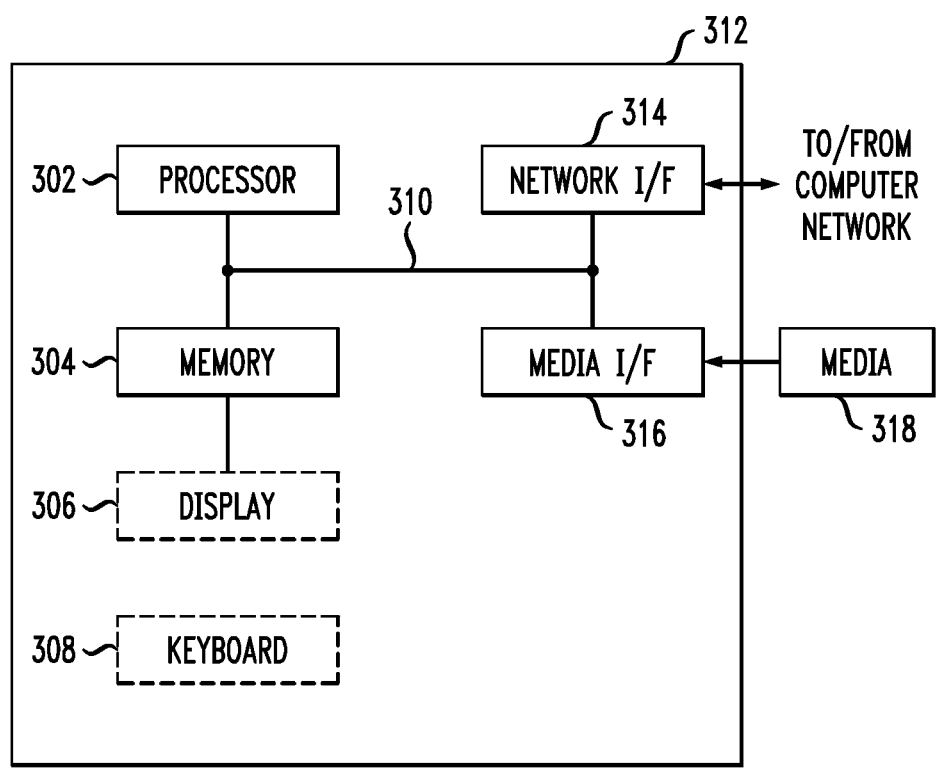
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using a population of concurrent tasks with different memory allocation to determine an optimal size parameter when the amount of data is not directly measureable.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
analyzing (i) a distinct pre-determined amount of memory allocation attributed to each task from a first sub-set of multiple tasks of a currently-executing MapReduce job and (ii) a distinct amount of data utilized by each task from the first sub-set of the multiple tasks;
determining the optimal memory allocation among the first sub-set of the multiple tasks based on said analyzing, wherein said memory size minimizes a cost function related to said memory allocation and said amount of data utilized;
performing a task-wise performance comparison among a second sub-set of the multiple tasks of the MapReduce job using the optimal memory size allocation among the first sub-set of the multiple tasks to generate a set of memory allocation results; and
dynamically applying the set of memory allocation results to the remaining tasks of the currently-executing MapReduce job during execution of the MapReduce job;
wherein said analyzing, said determining, said performing, and said applying are carried out by at least one computing device.

2. The method of claim 1, wherein said analyzing comprises categorizing multiple types of memory usage associated with the multiple tasks associated with the MapReduce job.

3. The method of claim 2, wherein said categorizing comprises differentiating the multiple types of memory usage by assigning multiple memory sizes to the multiple tasks associated with the MapReduce job based on estimated memory usage of each of the multiple tasks.

4. The method of claim 2, wherein said categorizing comprises differentiating the multiple types of memory usage by assigning multiple memory sizes to the multiple tasks associated with the MapReduce job based on an impact on end-to-end performance of the MapReduce job attributed to each of the multiple tasks.

5. The method of claim 2, wherein said categorizing comprises differentiating the multiple types of memory usage by assigning multiple memory sizes to the multiple tasks associated with the MapReduce job based on a distribution of data size across the multiple tasks.

6. The method of claim 1, comprising:
commencing execution of the MapReduce job, wherein said execution dispatches the multiple tasks associated with the MapReduce job.

7. The method of claim 6, wherein each of the multiple tasks run in parallel.

8. The method of claim 6, wherein each of the multiple tasks operate with a given subset of data.

9. The method of claim 1, wherein said analyzing memory usage of the first sub-set of multiple tasks comprises analyzing (i) used memory and (ii) available memory for each of the first sub-set of multiple tasks.

10. The method of claim 1, wherein the set of memory allocation results incorporates an input/output cost and memory usage.

11. The method of claim 1, wherein said dynamically applying comprises dynamically applying the set of memory allocation results to one or more additional tasks associated with the MapReduce job, wherein the amount of data associated with the one or more additional tasks is not directly measureable.

12. A computer program product, the computer program product comprising a computer readable storage medium having program instructions embodied therewith, the program instructions executable by a computing device to cause the computing device to:
analyze (i) a distinct pre-determined amount of memory allocation attributed to each task from a first sub-set of multiple tasks of a currently-executing MapReduce job and (ii) a distinct amount of data utilized by each task from the first sub-set of the multiple tasks;
determine the optimal memory allocation among the first sub-set of the multiple tasks based on said analyzing, wherein said memory size minimizes a cost function related to said memory allocation and said amount of data utilized;
perform a task-wise performance comparison among a second sub-set of the multiple tasks of the MapReduce job using the optimal memory allocation among the first sub-set of the multiple tasks to generate a set of memory allocation results; and
dynamically apply the set of memory allocation results to the remaining tasks of the currently-executing MapReduce job during execution of the MapReduce job.

13. The computer program product of claim 12, wherein said analyzing comprises categorizing multiple types of memory usage associated with the multiple tasks associated with the MapReduce job.

14. The computer program product of claim 13, wherein said categorizing comprises differentiating the one or more items of memory usage by assigning multiple memory sizes to the multiple tasks associated with the MapReduce job based on estimated memory usage of each of the multiple tasks.

15. The computer program product of claim 13, wherein said categorizing comprises differentiating the one or more items of memory usage by assigning multiple memory sizes to the multiple tasks associated with the MapReduce job based on an impact on end-to-end performance of the MapReduce job attributed to each of the multiple tasks.

16. The computer program product of claim 13, wherein said categorizing comprises differentiating the one or more items of memory usage by assigning multiple memory sizes to the multiple tasks associated with the MapReduce job based a distribution of data size across the multiple tasks.

17. The computer program product of claim 12, wherein the set of memory allocation results incorporates an input/output cost and memory usage.

18. The computer program product of claim 12, wherein said dynamically applying comprises dynamically applying the set of memory allocation results to one or more additional tasks associated with the MapReduce job, wherein the amount of data associated with the one or more additional tasks is not directly measureable.

19. A system comprising:
a memory; and
at least one processor coupled to the memory and configured for:
analyzing (i) a distinct pre-determined amount of memory allocation attributed to each task from a first sub-set of multiple tasks of a currently-executing MapReduce job and (ii) a distinct amount of data utilized by each task from the first sub-set of the multiple tasks;

determining the optimal memory allocation among the first sub-set of the multiple tasks based on said analyzing, wherein said memory size minimizes a cost function related to said memory allocation and said amount of data utilized;

performing a task-wise performance comparison among a second sub-set of the multiple tasks of the MapReduce job using the optimal memory allocation among the first sub-set of the multiple tasks to generate a set of memory allocation results; and dynamically applying the set of memory allocation results to the remaining tasks of the currently-executing MapReduce job during execution of the MapReduce job.

20. The system of claim 19, wherein the set of memory allocation results incorporates an input/output cost and memory usage.

* * * * *